United States Patent Office 3,256,189
Patented June 14, 1966

3,256,189
HYDROCARBYL ETHER REACTION PRODUCTS
James M. Petersen, Fishkill, and David D. Reed, Glenham, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 231,599
17 Claims. (Cl. 252—46.6)

The subject invention relates to novel reaction products of epoxy ether compounds and hydrocarbonthiophosphonic acids. More particularly, this invention relates to hydrocarbyl chalcahydroxyalkyl hydrocarbonthiophosphonates. The invention also relates to a method of manufacturing said thiophosphonates and to lubricant compositions thereof.

The term "epoxy ether" within the meaning of the invention includes "epoxy-oxyethers" and "epoxy-thiaethers." "Hydrocarbyl" includes haloaryl as well as monovalent hydrocarbons. "Chalca" denotes sulfur and a mixture of oxygen and sulfur.

The novel epoxy ether-hydrocarbonthiophosphonic acid reaction products of this invention have demonstrated usefulness as detergent, dispersant and thermal stability additives for lubricating oils and fuels.

The hydrocarbyl chalcahydroxyalkyl hydrocarbonthiophosphonate of this invention are represented by the following formula:

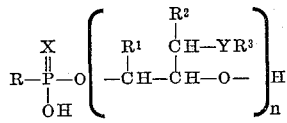

wherein R is a monovalent hydrocarbon radical, $R^1$ and $R^2$ are hydrogen or an alkyl radical from 1 to 6 carbon atoms, X is sulfur or a mixture of oxygen and sulfur, Y is sulfur or oxygen and $R^3$ is an organic monovalent radical of 1 to 20 carbons selected from the group consisting of alkyl, alkenyl, aryl, alkaryl, aralkyl and haloaryl and $n$ is an average value from 1 to 2, inclusively.

The epoxy ethers react with hydrocarbonthiophosphonic acids in the absence of catalyst.

PREPARATION OF THE HYDROCARBONTHIOPHOSPHONIC ACID REACTANT

Hydrocarbonthiophosphonic acid is derived from a hydrocarbon-$P_2S_5$ reaction product. As is well known, hydrocarbon-$P_2S_5$ reaction products are prepared by reaction of aromatic hydrocarbons, cycloaliphatic hydrocarbons, and aliphatic hydrocarbon with $P_2S_5$ at elevated temperatures. Although a wide variety of hydrocarbons such as aliphatic-substituted aryl compounds and aryl-substituted aliphatic compounds are usable as the hydrocarbon reactant, olefins are generally employed as the hydrocarbon reactant. Lubricating oil fractions constitute another preferred class of materials for reaction with $P_2S_5$ to form a product which after further treatment as outlined below is converted to hydrocarbyl chalcahydroxyalkyl hydrocarbonthiophosphonates.

The olefinic hydrocarbons reacted with $P_2S_5$ usually contain at least 12 carbon atoms although lower molecular weight olefins can be employed. Olefin polymers such as polyisobutylene, polybutylene, polypropylene and copolymers of olefins such as propylene-isobutylene copolymer are particularly preferred materials for reaction with $P_2S_5$. In general monoolefin polymers and copolymers having an average molecular weight between about 250 and 50,000 are employed with polymers and copolymers having an average molecular weight in the range from about 600 to 5,000 being preferred. Copolymers of conjugated dienes and monoolefin such as copolymer of butadiene and isobutylene having an average molecular weight in the above prescribed range also react with $P_2S_5$. Particularly preferred olefin polymers are polybutene polymers having an average molecular weight between 600 and 5,000.

The reaction product obtained by reacting $P_2S_5$ with hydrocarbon (the $P_2S_5$ constituting 5 to 40% of the reaction mixture) at a temperature from about 100–320° C. in a non-oxidizing atmosphere, for example, under a blanket of nitrogen, is hydrolyzed at a temperature between about 100 and 260° C. by contact with steam. Steam treatment hydrolyzes the hydrocarbon-$P_2S_5$ reaction product to a hydrocarbonthiophosphonic acid and inorganic phosphorus acids. The hydrocarbonthiophosphonic acid has the general formula:

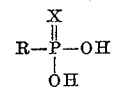

wherein R is derived from the charged hydrocarbon and usually a polyolefin radical containing 20 to 200 carbon atoms. X is sulfur or a mixture of oxygen and sulfur. X in the above formula is designated as sulfur or a mixture of sulfur and oxygen because the steam hydrolysis step usually results in replacement with oxygen of a portion of the sulfur joined to phosphorus.

The inorganic phosphorus acids formed during hydrolysis are removed prior to reaction with the alkylene oxides. A number of different procedures are available for removal of the inorganic phosphorus acids. In U.S. Patent Nos. 2,951,835 and 2,987,514, removal of the inorganic phosphorus acids is effected by contact with synthetic hydrous alkaline earth metal silicates and synthetic hydrous alkali metal silicates, respectively. Commonly-assigned, copending application Serial No. 841,668, filed September 23, 1959, by H. D. Kluge and R. G. Lacoste describes a process wherein inorganic phosphorus acids are removed from the hydrolyzed product by extraction with anhydrous methanol.

Specific examples of thiophosphonic acids contemplated herein are polybutene (940 M.W.), polyisobutylene (1500 M.W.), polypropylene (2500 M.W.), and polyisobutyl (600 M.W.) thiophosphonic acid.

EPOXY ETHER REACTANT

The epoxy ether compounds which react with hydrocarbonthiophosphonic acids in the absence of a catalyst to form the novel hydrocarbyl chalcahydroxyalkyl hydrocarbonthiophosphonates of this invention are represented by the general formula:

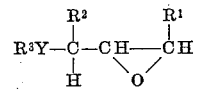

wherein $R^1$ and $R^2$ are hydrogen or alkyl radical from 1 to 6 carbon atoms, Y is oxygen or sulfur and $R^3$ is an organic monovalent radical having from 1 to 20 carbon atoms selected from the group consisting of alkyl, alkenyl, aryl, alkaryl, aralkyl and haloaryl. Specific examples of the epoxy ethers contemplated herein are 3-methoxy-1,2-epoxypropane; 3-butoxy-1,2-epoxypropane; 3-phenoxy-1,2 - epoxypropane; 3-(2'4'-dichlorophenoxy)-1,2-epoxypropane; 3-alloxy-1,2-epoxypropane; 3-toloxy-1,2-epoxypropane; 3-benzoxy-1,2-epoxypropane; 3-phenylmercapto-1,2 - epoxypropane and 3 - butoxy - 3 - methyl-1,2-epoxypropane.

PREPARATION OF THE THIOPHOSPHONATES OF THE INVENTION

Broadly, the preparation of the thiophosphonates of the invention may be described by the following equations:

(A)

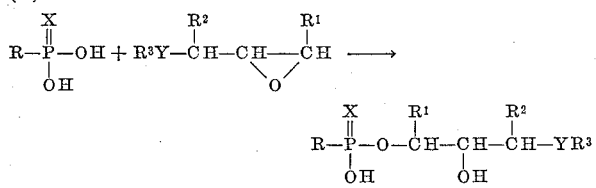

(B)

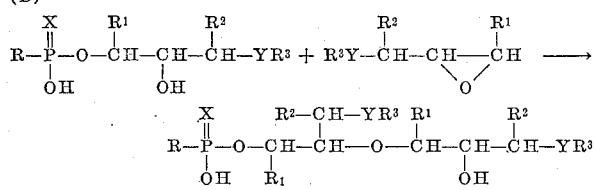

R, $R^1$, $R^2$, $R^3$ and X are as heretofore defined. The reaction designated by Equation A generally predominates, however, often at least a minor part of the thiophosphonate formed in Equation A reacts with additional epoxy ether in the manner described in Equation B. Therefore, in the generic formula describing the thiophosphonates of the invention $n$ is defined as a value from 1 to 2, inclusively. Fractional values between 1 and 2 are average values denoting a mixture of the thiophosphonate of Equation A and the thiophosphonate product of Equation B.

Reaction of the epoxy ether compound with hydrocarbonthiophosphonic acid to produce the novel hydrocarbyl chalcahydroxyalkyl hydrocarbonthiophosphonates is affected at a temperature between about 25 and 175° C., preferably between about 75 and 125° C. and at essentially atmospheric pressure. The reactant mole ratio of epoxy ether to thiophosphonic acid in the reaction mixture is advantageously between about 0.7:1 and 5:1 and desirably between about 1:1 and 2.5:1.

Specific examples of the hydrocarbyl chalcahydroxyalkyl hydrocarbonthiophosphonates in addition to those described in the subsequent examples are 3-toloxy-2-hydroxy-1-methylpropyl polyisobutylene (1500 M.W.) thiophosphonate; 3-benzthia-1,3-dimethyl-2-hydroxypropyl polypropylene (2500 M.W.) thiophosphonate; and 6-methoxy-5-hydroxy-3-oxa-2-(1'-methoxy methylene) polybutene (940 M.W.) thiophosphonate.

LUBRICANT COMPOSITIONS OF THE NOVEL THIOPHOSPHONATES

In lubricant compositions the hydrocarbonthiophosphonates of the invention are present in the lubricating oil in concentrations sufficient to impart detergent and dispersant properties thereto. Advantageously, in finished lubricants the thiophosphonates are usually present in a concentration between about 0.2 and 10 wt. percent, desirably between about 1 and 5 wt. percent. In concentrates used in the formation of the finished lubricants, the concentration of the thiophosphonate can be as high as 50 wt. percent.

Hydrocarbon mineral oils are usable as base oils in the contemplated lubricants. They can be paraffin base, naphthlene base, or mixed paraffin-naphthene base distillate or residual oils. Paraffin base distillate lubricating oil fractions are used in formulation of premium grade motor oils such as are contemplated herein. The lubricating base oils generally have been subjected to solvent refining to improve their lubricity and viscosity-temperature relationship as well as solvent dewaxing to remove waxy components and improve the pour of the oil. Broadly speaking, mineral lubricating oils having an SUS viscosity at 100° F. between 50 and 1,000 may be used in the formulation of the improved lubricants of this invention but usually the SUS viscosity range falls between 70 and 300 at 100° F.

The mineral lubricating oils containing the thiophosphonates of the invention can also contain other additives designed to impart additional desirable properties thereto. For example, V.I. improvers such as the polymethacrylates are normally included therein as are corrosion inhibitors and other detergents.

A widely used V.I. improver is a polymethacrylate of the general formula:

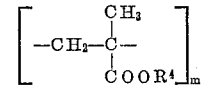

wherein $R^4$ is an aliphatic radical, e.g., from 1 to 20 carbons and $m$ is an integer of between 600 and 35,000.

Another supplementary additive is the detergent alkaline earth metal alkylphenolates. Barium nonylphenolate, barium dodecylcresolate and calcium dodecylphenolate are examples of such detergents. These products are usually present in the lubricating oil in a concentration between 0.1 and 5 wt. percent.

Still another supplementary additive is divalent metal dialkyl dithiophosphate resulting from the neutralization of a $P_2S_5$-alcohol reaction product with a divalent metal or divalent metal oxide. This additive acts as an antioxidant and corrosion inhibitor. Barium and zinc dialkyl dithiophosphates are the most widely used. Metal dialkyl dithiophosphates are usually present in the lubricant in a concentration between 0.1 and 3 wt. percent.

Synthetic ester or ether oils may be alternatively used as the base lubricant. High molecular weight, high boiling liquid aliphatic dicarboxylic acid esters possess excellent viscosity-temperature relationships and lubricating properties and are finding ever-increasing utilization in lubricating oils adapted for high and low temperature lubrication. Esters of this type are used in the formulation of jet engine oils.

Examples I to III illustrate the preparation of the hydrocarbonthiophosphonic acids from polybutene. The Examples IV to X demonstrate the preparation of the hydrocarbyl chalcahydroxyalkyl hydrocarbonthiophosphonates from the thiophosphonic acids in Examples I to III. Examples XI and XII illustrate the lubricating additive properties of the thiophosphonate and lubricant compositions thereof.

Example I

A polybutene-$P_2S_5$ reaction product was prepared by reacting polybutene having an average molecular weight of about 940 with the $P_2S_5$ in a mole ratio of polybutene to $P_2S_5$ of 1:1 and in the presence of sulfur in an amount equal to 1.3 wt. percent of polybutene at 232° C. The reaction was continued until the reaction mixture was soluble in n-pentane. The reaction product was diluted with approximately 150 wt. percent of a naphthene base oil having an SUS viscosity at 100° F. of 100, steamed at 176° C. for 10 hours in a nitrogen atmosphere and then dried by passage of nitrogen therethrough at 176° C. The hydrolyzed (steamed) product was extracted with 50% volume of methyl alcohol at 60° C. to give a methanol extract containing inorganic phosphorus acids and a lubricating oil raffinate containing polybutene (940 M.W.) thiophosphonic acid which after stripping free of methanol had a neut. No. (neutralization number) of 22.6.

The theoretical percent sulfur based on neut. No. for a structure in the raffinate of the formula:

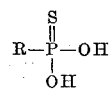

where R is a polybutene radical of an average molecular weight of 940, is 1.29 wt. percent. The percent sulfur found in the thiophosphonic acid product was 0.51 wt. percent indicating said product being of the formula:

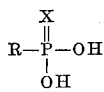

where X is a mixture of sulfur and oxygen and R is as heretofore defined.

*Example II*

A thiophosphonic acid was prepared by reacting polybutene having an average molecular weight of about 940 with the $P_2S_5$ in a mole ratio of polybutene to $P_2S_5$ of 1:1 and in the presence of sulfur in an amount equal to 1.3 wt. percent polybutene. After reaction at 232° C. which was continued until the mixture was soluble in n-pentane, the reaction product was diluted with approximately 150 wt. percent of a naphthene base oil having an SUS viscosity at 100° F. of 100, steamed at 176° C. for 10 hours in a nitrogen atmosphere and then dried by passage of nitrogen therethrough at 176° C. The hydrolyzed (steamed) product was extracted with 50% by volume of methyl alcohol at 60° C. to give a methanol extract containing inorganic phosphorus acids and a lubricating oil raffinatae containing polybutene (940 M.W.) thiophosphonic acid which after stripping free of methanol had a neut. No. of 18.3.

The theoretical percent sulfur based on neut. No. for a structure in the raffinate of the formula:

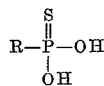

where R is a polybutene radical (940 M.W.), is 1.04 wt. percent. The percent sulfur found in the thiophosphonic acid product was 0.60 wt. percent indicating said product is of the formula:

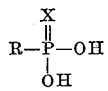

where X is a mixture of oxygen and sulfur and R is as heretofore defined.

*Example III*

A thiophosphonic acid was prepared by reacting polybutene having an average molecular weight of about 940 with the $P_2S_5$ in a mole ratio of polybutene to $P_2S_5$ of 1:1 and in the presence of sulfur in an amount equal to 1.3 wt. percent of polybutene. After reaction at 232° C. which was continued until the mixture was soluble in n-pentane, the reaction product was diluted with approximately 150 wt. percent of a naphthene base oil having an SUS viscosity at 100° F. of 100, steamed at 176° C. for 10 hours in a nitrogen atmosphere and then dried by passage of nitrogen therethrough at 176° C. The hydrolyzed product was extracted with 50% volume of methyl alcohol at 60° C. to give a methanol extract containing inorganic phosphorus acids and a lubricating oil raffinate containing polybutene (940 M.W.) thiophosphonic acid which after stripping free of methanol had a neut. No. of 18.1.

The theoretical percent sulfur based on neut. No. of a thiophosphonic acid in the raffinate of the formula:

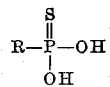

where R is a polybutene (940 M.W.), is 1.03 wt. percent. The percent sulfur found in the thiophosphonic acid product was 0.50 wt. percent indicating a product of the formula:

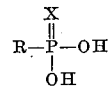

where X is a mixture of oxygen and sulfur and R is as heretofore defined.

*Example IV*

Polybutene (940 M.W.) thiophosphonic acid prepared in Example I in the amount of 496 grams (0.2 mole based on neut. No.) was charged to a one liter 3-necked flask equipped with a stirrer, a thermometer and gas inlet tube. The acid was heated to 93° C. (200° F.) and an equimolar amount (17.6 grams) of 3-methoxy-1,2-epoxypropane was added dropwise. When the addition was completed, the heating was continued for 2 hours whereupon an adidtional 0.1 mole (8.8 grams) of 3-methoxy-1,2-epoxypropane was added. The mixture is heated for an additional 2 hours at 93° C. and the product was stripped at 93° C. (10–15 mm. Hg) utilizing a nitrogen flush. After stripping, there was obtained a thiophosphonate which showed by analysis to be of the formula:

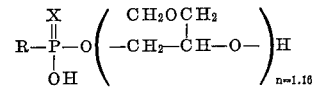

and primarily consisting of 3-methoxy-2-hydroxypropyl polybutene (940 M.W.) thiophosphonate of the formula:

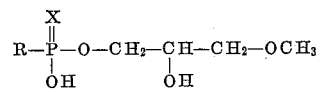

wherein R in the above is the polybutene radical of 940 average molecular weight and X is a mixture of sulfur and oxygen. The thiophosphonate product analyzed as follows:

| Description | Calculated | Found |
| --- | --- | --- |
| Neut. No. | 0 | 1.3 |
| Hydroxyl No. | 25.2 | 22.0 |
| Phosphorus, Wt. Percent | 1.2 | 1.1 |
| Mole Ratio Oxide/Acid Reactants in Product | 1.16 | 1.16 |

*Example V*

The procedure of Example IV was essentially repeated except a total of 39 grams (0.3 mole based on neut. No.) of 3-butoxy-1,2-epoxypropane was employed as the oxide reactant. The final reaction mixture was stripped at a temperature of 93° C. (10–15 mm. Hg) and the residual thiophosphonate product was analyzed and found to be of the formula:

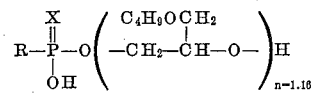

and to consist primarily of 3-butoxy-2-hydroxypropyl polybutene (940 M.W.) thiophosphonate of the following formula:

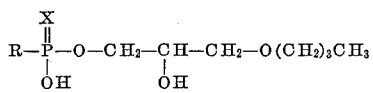

where R in the above is a polybutene radical of 940 average molecular weight and X is a mixture of sulfur and oxygen. The product analyzed as follows:

| Description | Calculated | Found |
|---|---|---|
| Neut. No. | 0 | 1.18 |
| Hydroxyl No. | 24.8 | 22 |
| Phosphorus, Wt. Percent | 1.18 | 1.1 |
| Mole Ratio Oxide/Acid Reactants in Product | 1.16 | 1.16 |

*Example VI*

The procedure of Example IV was essentially repeated except 2,000 grams (0.65 mole based on neut. No.) of polybutene (940 M.W.) thiophosphonic acid of a neut. No. of 18.3 and 130 grams (0.84 mole) 3-phenoxy-1,2-epoxypropane was employed as the reactants. Further, the reaction temperature was maintained at 121° C. for 2 hours and the reaction product was not stripped. Still further, the thiophosphonic acid of Example II was employed. The final product was shown by analysis to be of the formula:

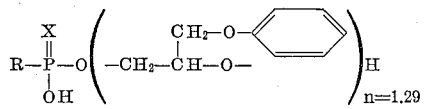

and consist primarily of 3-phenoxy-2-hydroxypropyl polybutene (940 M.W.) thiophosphonate of the formula:

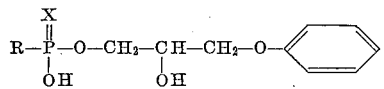

where R in the above is a polybutene radical of 940 average molecular weight and X is a mixture of sulfur and oxygen. The product analyzed as follows:

| Description | Calculated | Found |
|---|---|---|
| Neut. No. | 0 | 2.2 |
| Hydroxyl No. | 22.2 | 20 |
| Percent Phosphorus | 0.95 | 0.76 |
| Mole Ratio Oxide/Acid | 1.29 | 1.29 |

*Example VII*

The procedure of Example IV was essentially repeated except the epoxy ether compound employed was 88 grams (0.4 mole) of 3-(2',4'-dichlorophenyl)-1,2-epoxypropane. Furthermore, in the second epoxy ether addition 0.2 mole was added. The product remaining after stripping to a temperature of 93° C. (10–15 mm. Hg) was shown by analysis to be of the formula:

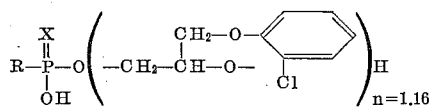

and consists primarily of 3-(2',4'-dichlorophenoxy)-2-hydroxypropyl polybutene (940 M.W.) thiophosphonate of the following formula:

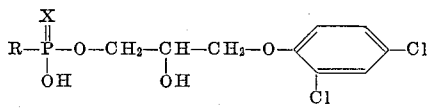

wherein R is the polybutene radical of 940 average molecular weight and X is a mixture of sulfur and oxygen. The product analyzed as follows:

| Description | Calculated | Found |
|---|---|---|
| Neut. No. | 0 | 0.85 |
| Hydroxyl No. | 38.5 | 36 |
| Phorphorus, Wt. Percent | 1.06 | 0.77 |
| Percent Chlorine | 4.86 | 4.9 |
| Mole Ratio Oxide/Acid Reactants in Product | 2.0 | 1.16 |

*Example VIII*

The procedure of Example IV was essentially repeated except 2500 grams (0.806 mole based on neut. No.) of polybutene (940 M.W.) thiophosphonic acid having a neut. No. of 18.1 and 114 grams (1.0 mole) allyl glycidyl ether was employed. Further, the thiophosphonic acid was that of Example III. Still further, the final reaction product was not stripped. The final product by analysis was found to be of the formula:

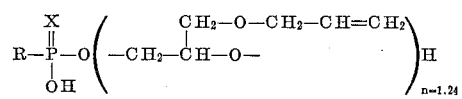

and to consist primarily of 3-alloxy-2-hydroxypropyl polybutene (940 M.W.) thiophosphonate of the following formula:

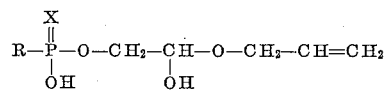

wherein R is a polybutene radical of 940 average molecular weight and X is a mixture of sulfur and oxygen. The product analyzed as follows:

| Description | Calculated | Found |
|---|---|---|
| Neut. No. | 0 | 1.8 |
| Hydroxyl No. | 21.5 | 19 |
| Phosphorus, Wt. Percent | 0.96 | 0.85 |
| Mole Ratio Oxide/Acid Reactants in Product | 1.24 | 1.24 |

*Example IX*

The procedure of Example IV was essentially repeated except 49.5 grams (0.298 mole) phenyl glycidyl sulfide was used instead of the methoxypropane compound. The final reaction mixture was stripped to a temperature of 93° C. (10–15 mm. Hg) and the residual product was shown by analysis to be of the formula:

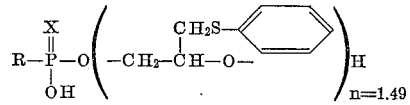

and consists primarily of 3-phenylmercapto-2-hydroxypropyl polybutene (940 M.W.) thiophosphonate of the following formula:

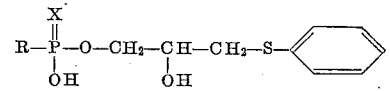

wherein R is a polybutene radical of a 940 average molecular weight and X is a mixture of sulfur and oxygen. The product analyzed as follows:

| Description | Calculated | Found |
|---|---|---|
| Neut. No. | 0 | 0.87 |
| Hydroxyl No. | 30.6 | 24.0 |
| Phosphorus, Wt. Percent | 1.14 | 0.93 |
| Sulfur, Wt. Percent | 1.75 | 2.23 |
| Mole Ratio Oxide/Acid Reactants in Product | 1.49 | 1.49 |

Example X

The procedure of Example IV was essentially repeated except 54 grams (0.34 mole) of n-pentyl glycidyl sulfide was used instead of the methoxypropane compound. The final reaction mixture was stripped to a temperature of 93° C. (10–15 mm. Hg) and the residual product was shown by analysis to be primarily of the formula:

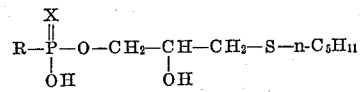

wherein R is a polybutene radical of a 940 average molecular weight and X is a mixture of sulfur and oxygen. The product analyzed as follows:

| Description | Calculated | Found |
|---|---|---|
| Sulfur, Wt. Percent | 2.48 | 2.43 |
| Hydroxyl No | 20.4 | 17 |
| Neut. No | 0 | 4.4 |

Example XI

This example illustrates the lubricating additive properties of the thiophosphonates contemplated herein and lubricant compositions containing such thiophosphonates.

An SAE 10W-30 motor oil containing the thiophosphonate product ($n=1.16$) of Example V as the detergent-dispersant additive as of the following formulation.

COMPOSITION A

| Description | Concentration, wt. percent |
|---|---|
| Refined paraffinic distillate oil (SUS visc. at 100° F.=100) | 87.93 |
| Thiophosphonate product of Example V | 4.79 |
| Barium $C_{12}$-alkylphenolate | 1.83 |
| Zinc isopropyl 1,3-dimethyl butyl dithiophosphate | 0.88 |
| Mineral oil concentrate containing 25 wt. percent of a copolymer of mixed methacrylate alkyl esters in which the alkyl groups range from butyl to octadecyl | 4.00 |
| $CO_2$ neutralized basic barium sulfonate (0.08% Ba) | 0.57 |
| Dimethylsilicone anti-foam concentrate (p.p.m.) | 150 |
| Viscosity, SUS: | |
| At 0° F. | 12,000 |
| At 100° F. | 330 |
| At 210° F. | 62 |

The above lubricant composition was tested in the CLR Sludge Engine Test together with a blank, i.e., Composition A minus the thiophosphonate. The results are as follows:

CLR SLUDGE ENGINE TEST RESULTS [1]

| Hours | 38 | 54 | 70 | 94 |
|---|---|---|---|---|
| Description: | | | | |
| Sludge Rating of Composition A | 9.6 | 9.2 | 8.3 | 5.6 |
| Sludge Rating of Blank | 6.9 | 5.4 | | |

[1] Sludge free oil rating=10.

Example XII

This example further illustrates the detergent-dispersant properties of the thiophosphonates of the invention.

A mixture of 0.5 gram of t-butyl hydroperoxide and 0.5 gram of Tetralin hydroperoxide was dissolved in a 50 gram sample of isooctane solution containing the thiophosphonate to be tested. The resulting blend was exposed to a rapid stream of $SO_2$ for 1 minute at ambient temperature. After stirring for an additional 30 seconds, the reaction mixture was transferred to a volumetric tube and centrifuged. The volume of the insoluble deposit-like material formed was measured; the supernatant liquid was decanted and the residue dried and weighed. The results are as follows:

| Detergent | Detergent Concentration, Wt. percent | Deposit Volume, mls. | Deposit Weight, grs. |
|---|---|---|---|
| Blank (Mineral Oil) | 1 | 13.5 | 1.26 |
| Thiophosphonate Product of Example VI | 3.3 | 0.1 | 0.07 |
| Thiophosphonate Product of Example VIII | 3.3 | 0.07 | 0.04 |

As can be seen from the above undesirable deposits are substantially lower when the thiophosphonates of the invention are present indicating their good detergent and dispersant properties.

We claim:

1. A product selected from the group consisting of hydrocarbyl chalcahydroxyalkyl hydrocarbonthiophosphonate and a mixture of said hydrocarbonthiophosphonate and the corresponding hydrocarbonphosphonate, said hydrocarbonthiophosphonate of the formula:

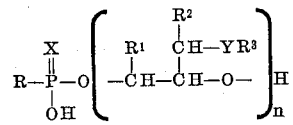

wherein R is a monovalent hydrocarbon derived from a polyolefin having an average molecular weight between about 250 and 50,000, $R^1$ and $R^2$ are radicals selected from the group consisting of hydrogen and alkyl from 1 to 6 carbon atoms, $R^3$ is an organic radical of one to 20 carbons selected from the group consisting of alkyl, alkenyl, aryl, haloaryl, aralkyl, alkaryl, X is sulfur, Y is selected from the group consisting of sulfur and oxygen and $n$ is a value from 1 to 2, inclusively, said mixture consisting of a major amount of said hydrocarbonthiophosphonate and a minor amount of said corresponding hydrocarbonphosphonate where X is oxygen.

2. A product in accordance with claim 1 wherein said product is said mixture, said R is polybutene radical having an average molecular weight of 940, $R^3$ is methyl, Y is oxygen and $n$ is 1.16.

3. A product in accordance with claim 1 wherein said product is said mixture, said R is polybutene radical having an average molecular weight of 940, $R^3$ is butyl, Y is oxygen and $n$ is 1.16.

4. A product in accordance with claim 1 wherein said product is said mixture, said R is polybutene radical having a molecular weight of 940, $R^3$ is allyl, Y is oxygen and $n$ is 1.24.

5. A product in accordance with claim 1 wherein said product is said mixture, said R is polybutene radical having an average molecular weight of 940, $R^3$ is 2',4'-dichlorophenyl, Y is oxygen and $n$ is 1.16.

6. A product in accordance with claim 1 wherein said product is said mixture, said R is polybutene radical having an average molecular weight of 940, $R^3$ is phenyl, Y is oxygen and $n$ is 1.29.

7. A product in accordance with claim 1 wherein said product is said mixture, said R is polybutene radical having an average molecular weight of 940, $R^3$ is phenyl, Y is sulfur and $n$ is 1.49.

8. A product in accordance with claim 1 wherein said product is said mixture, said R is polybutene radical having an average molecular weight of 940, $R^3$ is n-pentyl, Y is sulfur and $n$ is 1.

9. A lubricating oil composition comprising lubricating oil containing a component selected from the group consisting of hydrocarbyl chalcahydroxyalkyl hydrocarbonthiophosphonate and a mixture of said thiophosphonate and corresponding phosphonate in an amount sufficient to impart detergent-dispersant properties thereto, said thiophosphonate having the formula:

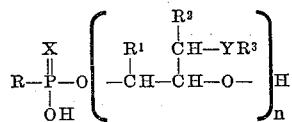

wherein R is a monovalent hydrocarbon derived from a polyolefin having a molecular weight between about 250 and 50,000, $R^1$ and $R^2$ are radicals selected from the group consisting of hydrogen and alkyl from 1 to 6 carbon atoms, $R^3$ is an organic radical of 1 to 20 carbon atoms selected from the group consisting of alkyl, alkenyl, aryl, haloaryl, aralkyl, alkaryl, X is selected from the group consisting of sulfur and a mixture of sulfur and oxygen, Y is a chalcogen sulfur and $n$ is a value from 1 to 2, inclusively, said lubricating oil selected from the group consisting of mineral lubricating oil, synthetic ester lubricating oil and synthetic ether lubricating oil, said mixture consisting of a major amount of said thiophosphonate and a minor amount of said corresponding phosphonate where X is oxygen.

10. A lubricating oil in accordance with claim 9 wherein $R^1$ and $R^2$ are hydrogen and said component is said mixture.

11. A lubricating oil in accordance with claim 10 wherein said R is polybutene radical having an average molecular weight of 940, $R^3$ is methyl, Y is oxygen and $n$ is 1.16.

12. A lubricating oil in accordance with claim 10 wherein R is a polybutene radical having an average molecular weight of 940, $R^3$ is butyl, Y is oxygen and $n$ is 1.16.

13. A lubricating oil in accordance with claim 10 wherein R is polybutene radical having a molecular weight of 940, $R^3$ is allyl, Y is oxygen and $n$ is 1.24.

14. A lubricating oil in accordance with claim 10 wherein R is a polybutene radical having an average molecular weight of 940, $R^3$ is 2′,4′-dichlorophenyl, Y is oxygen and $n$ is 1.16.

15. A lubricating oil in accordance with claim 10 wherein R is a polybutene radical having an average molecular weight of 940, $R^3$ is phenyl, Y is oxygen and $n$ is 1.29.

16. A lubricating oil in accordance with claim 10 wherein R is a polybutene radical having an average molecular weight of 940, $R^3$ is phenyl, Y is sulfur and $n$ is 1.49.

17. A lubricating oil in accordance with claim 10 wherein R is a polybutene radical having an average molecular weight of 940, $R^3$ is n-pentyl, Y is sulfur and $n$ is 1.

References Cited by the Examiner

UNITED STATES PATENTS

| | | | |
|---|---|---|---|
| 2,683,168 | 7/1954 | Jensen et al. | 260—461 |
| 2,914,478 | 11/1959 | Neff | 252—46.6 |
| 3,123,630 | 3/1964 | Oberender et al. | 252—46.6 |
| 3,158,641 | 11/1964 | Reed et al. | 252—46.6 |
| 3,182,022 | 5/1965 | Siegart et al. | 252—46.6 |

FOREIGN PATENTS

| | | |
|---|---|---|
| 792,553 | 3/1958 | Great Britain. |
| 838,928 | 6/1960 | Great Britain. |

DANIEL E. WYMAN, *Primary Examiner.*

L. G. XIARHOS, *Assistant Examiner.*

UNITED STATES PATENT OFFICE
CERTIFICATE OF CORRECTION

Patent No. 3,256,189                              June 14, 1966

James M. Petersen et al.

It is hereby certified that error appears in the above numbered patent requiring correction and that the said Letters Patent should read as corrected below.

Column 6, lines 26 to 30, for that portion of the formula reading

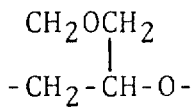      read      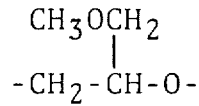

column 7, lines 60 to 65, for that portion of the formula reading

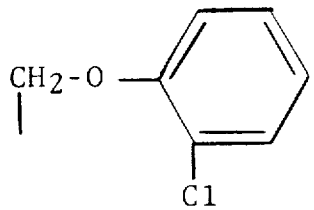      read      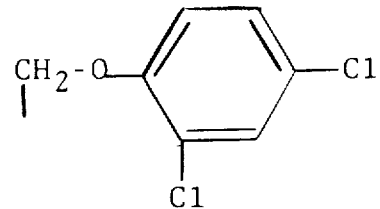

column 11, lines 15 to 17, for "selected from the group consisting of sulfur and a mixture of sulfur and oxygen" read -- sulfur --; same column 11, line 17, for "sulfur" read -- selected from the group consisting of sulfur and oxygen --.

Signed and sealed this 1st day of August 1967.

(SEAL)
Attest:

EDWARD M. FLETCHER, JR.                   EDWARD J. BRENNER
Attesting Officer                          Commissioner of Patents